United States Patent [19]
Ropitzky

[11] 3,885,120
[45] May 20, 1975

[54] ELECTRODE AND FLUX COMBINATION FOR SUBMERGED ARC WELDING

[75] Inventor: Joseph Ropitzky, Waterford, N.Y.

[73] Assignee: The United States of America as represented by the Secretary of the Army, Washington, D.C.

[22] Filed: July 3, 1973

[21] Appl. No.: 376,259

[52] U.S. Cl................................. 219/73; 219/146
[51] Int. Cl............................................. B23k 9/18
[58] Field of Search ............. 219/146, 145, 137, 73; 148/23, 24, 26

[56] References Cited
UNITED STATES PATENTS

| | | | |
|---|---|---|---|
| 3,110,798 | 11/1963 | Keay, Jr. et al. | 219/73 |
| 3,215,809 | 11/1965 | Morimoto et al. | 219/146 X |
| 3,259,970 | 7/1966 | Morita et al. | 219/73 X |
| 3,394,238 | 2/1968 | Wilcox | 219/73 |
| 3,476,909 | 11/1969 | Kameda et al. | 219/146 X |
| 3,539,765 | 11/1970 | DuHena et al. | 219/146 |
| 3,745,294 | 7/1973 | Arikawa et al. | 219/146 |
| 3,769,491 | 10/1973 | DeLong | 219/137 |

*Primary Examiner*—J. V. Truhe
*Assistant Examiner*—G. R. Peterson
*Attorney, Agent, or Firm*—Eugene E. Stevens, III; Robert P. Gibson; Nathan Edelberg

[57] ABSTRACT

In order to apply the submerged arc method of welding to a medium-carbon, Ni-Cr-Mo-V steel, and obtain a weld deposit which can be heat treated to provide a yield strength of 160–180 ksi along with a reduction in area of at least 25 percent and an impact resistance of at least 15 ft/lbs. at −40°F, an electrode wire having no more than 0.04 percent of silicon is utilized with a neutral welding flux having a residual percentage of manganese and from 1.5–3.0 percent of silicon to insure the proper deoxidation of the molten electrode. The flux also includes about 0.30 percent carbon for replacing that portion thereof lost from the electrode wire during the formation of the weld deposit.

2 Claims, No Drawings

ELECTRODE AND FLUX COMBINATION FOR SUBMERGED ARC WELDING

BACKGROUND OF THE INVENTION

This invention relates to the submerged arc welding of an alloy steel having high-strength and good ductility and is more particularly directed to a welding electrode and a welding flux which combine during melting to produce a weld deposit capable of being heat-treated to substantially the same mechanical characteristics as the steel being welded.

Experience has shown that large caliber gun tubes fabricated of a medium carbon, Ni-Cr-Mo-V alloy of the type described in Aerospace Material Specification 6427D and hereinafter referred to as "gun steel," can be heat-treated to provide a yield strength of 160–180 ksi along with a reduction in area of between 25 and 50 percent and a Charpy V-notch impact value of between 15 and 25 ft/lbs. at −40°F. These tubes generally include such accessory equipment as breech rings, muzzle brakes, bore evacuators, etc., which must possess equivalent mechanical characteristics and are therefore preferably fabricated of the same alloy steel. Although it is possible to drastically reduce the production cost of these accessories by manufacturing mating sections adapted to be joined by welding, considerable difficulty has been encountered in forming weld deposits with substantially the same mechanical characteristics as the steel being welded. In order to provide the high ductility and impact strength expected from high-strength gun steel, it has heretofore been necessary to resort to the relatively expensive electron beam technique of welding. However, the need for a vacuum chamber and the handling problems created by intricate configurations of the workpiece are factors which have heretofore prevented the manufacture of these gun tube accessories on an economical production basis. While it is well known that production welding could be more suitably accomplished by the submerged arc process wherein a layer of granular and fusible flux serves to protect the molten weld deposit against atmospheric contamination, previous attempts to weld high-strength gun steel with commercial electrodes and fluxes have invariably proven unsuccessful due to the inadequate ductility and toughness of the resulting weld deposit.

Accordingly, it is an object of this invention to provide an improved combination of welding electrode and flux for the submerged arc technique of welding gun steel meeting the requirements of Aerospace Material Specification 6427D and of at least 1½ inches in thickness wherein the resulting weld deposit is not subject to cold cracking and can be readily heat-treated to provide a room temperature yield strength of 160–180 ksi, a Charpy V-notch impact resistance of at least 15 ft/lbs. at −40°F, and a ductility as measured by a reduction in area of at least 25 percent.

Another object of the present invention resides in the provision of electrode and flux combination, as aforesaid, wherein the compositions thereof are specifically tailored to produce a weld deposit with significantly lower manganese and silicon content than heretofore possible with commercially available compositions.

A further object of this invention is to provide a welding flux, as aforesaid, which is relatively free of manganese and contains a specific amount of deoxidizing silicon as well as an added quantity of carbon to replace that portion in the electrode which is lost during the formation of the weld deposit.

It is an additional object of the present invention to provide a welding wire and flux combination, as aforesaid, wherein the silicon content of the wire is no greater than 0.04 percent while the flux is arranged to contain no more than a trace of manganese.

SUMMARY OF THE INVENTION

It has been found that the foregoing objects can best be achieved if the welding wire electrode is fabricated from a ferrous alloy containing, in addition to iron, the following elements in percentage by weight: 0.35 – 0.40 percent carbon, 0.45 – 0.50 percent manganese, 0.04 percent maximum silicon, 3.25 –3.50 percent nickel, 0.85 – 0.90 percent chromium, 0.62 – 0.66 percent molybdenum, 0.10 percent maximum vanadium, 0.08 percent maximum copper, 0.04 percent maximum aluminum, 0.008 percent maximum phosphorus, and 0.01 percent maximum sulfur. At the same time, the welding flux should be formed as a neutral silicate-base composition tailored to include about 0.30 percent carbon, no more than 0.05 percent manganese, and about 1.5 – 3.0 percent of silicon. During the melting of the welding electrode wire, a portion of the carbon lost through oxidation is replenished by the carbon in the molten flux. At the same time, the major portion of the silicon in the flux serves to deoxidize the molten weld deposit so that the residual silicon content thereof is considerably less than that heretofore found in commercial weld deposits utilized to join high-strength, ductile, and impact-resistant steel. The reduced silicon content of the weld deposit provides a desirable improvement in reduction in area which is further increased by the fact that the flux contains very little manganese and consequently does not replace the percentage of manganese lost by the welding electrode wire during the transfer thereof into weld deposit form. When the foregoing electrode-flux combination is utilized in accordance with standard welding practice, the composition of the resulting weld deposit will fall within the following range as a percentage by weight: 0.20 – 0.25 percent carbon, 0.33 – 0.35 percent manganese, 0.18 – 0.22 percent silicon, 3.0 – 3.5 percent nickel, 0.80 – 0.87 percent chromium, 0.62 – 0.68 percent molybdenum, 0.07 – 0.10 percent vanadium, 0.08 percent maximum copper, 0.04 percent maximum aluminum, 0.008 percent maximum phosphorus, 0.008 percent maximum sulfur, and the balance of iron. When properly heat treated, such alloy provides an optimum combination of yield strength, reduction in area and impact resistance, generally equivalent to that obtained with a correspondingly heat-treated steel such as the previously mentioned AMS 6427D.

DESCRIPTION OF A PREFERRED EMBODIMENT

Extensive experience with various high strength alloy steels which are heat-treatable to the 160–180 ksi yield strength required of the large caliber gun tubes utilized in modern artillery weapons has demonstrated that only a nickel-chrome-molybdenum-vanadium gun steel of the type described in Aerospace Material Specification 6427D will provide the desired combination of a minimum 25 percent reduction in area and a minimum Charpy V-notch impact strength of 15 ft/lbs. at −40°F. A specific example of this type of gun steel is the E-4330 (Mod) alloy manufactured by Green River Steel Corp. of Owensboro, Ky., with the following nominal composition:

| Element | Percent by Weight |
| --- | --- |
| Carbon | 0.30 |
| Manganese | 0.90 |
| Silicon | 0.30 |
| Nickel | 2.00 |
| Chromium | 0.85 |
| Molybdenum | 0.43 |
| Vanadium | 0.08 |
| Copper | Residual |
| Aluminum | Residual |
| Phosphorus | 0.010 maximum |
| Sulfur | 0.010 maximum |
| Iron | Balance |

There are many instances in the fabrication of ordnance equipment from this special steel where the welding of one or more sections to form a unitary structure would be far more economical than the customary forging and machining of relatively large and intricate shapes. However, attempts to weld this particular AMS-6427D type of gun steel by the submerged arc process on a production-type basis have heretofore been unsuccessful due to the tendency of the weld deposit to crack during cooling. Since the cooling rate of these weld deposits generally produces a self-quenching effect thereon, it is readily apparent that any porosity or brittleness therein will increase the susceptibility thereof to cracking. This problem is additionally complicated by the fact that sufficient silicon and manganese must be present to fully deoxidize the resulting weld deposit during the molten state thereof. However, since the amount of deoxidation required is dependent on a number of variable factors, the percentages of silicon and manganese utilized in both the wire and the flux are generally considerably greater than what is actually required. As a result, the residual silicon and manganese in the weld deposit may, in many instances, be sufficient to result in cracking thereof upon cooling.

However, it has been discovered that it is not necessary that the silicon and the manganese be substantially equally divided between both the welding wire and in the flux in order to provide the desired deoxidation of the weld deposit. Instead, substantially the same result can be satisfactorily achieved when one of the deoxidizers is concentrated in the flux while the other is similarly concentrated in the welding wire. Since the flux melts at a faster rate than the electrode wire, the silicon, which possesses a greater affinity for oxygen than the manganese, is preferably incorporated in the flux in order to be more available for the deoxidization function thereof. This choice is additionally supported by the fact that silicon also improves the fluidity with which the molten electrode wire is deposited along the joint being welded and is therefore more readily available for that purpose when incorporated in the flux rather than in the wire. The manganese, on the other hand, is preferably incorporated in the slower melting wire since its ability to combine with the sulfur therein will minimize the percentage of the manganese which otherwise would be available for pickup by the resulting weld deposit to the detriment of the strength and hardenability thereof.

In order to permit the welding of the aforementioned AMS 6427D steel, the wire utilized as the electrode is preferably 3/32 inch in diameter, free of the copper coating customarily provided on commercially alloyed electrodes of this type, and is formulated to the following preferred composition:

| Element | Percent by Weight |
| --- | --- |
| Carbon | 0.35 – 0.40 |
| Manganese | 0.45 – 0.50 |
| Silicon | 0.04 maximum |
| Nickel | 3.25 – 3.50 |
| Chromium | 0.85 – 0.90 |
| Molybdenum | 0.62 – 0.66 |
| Vanadium | 0.10 maximum |
| Copper | 0.08 maximum |
| Aluminum | 0.04 maximum |
| Phosphorus | 0.008 maximum |
| Sulfur | 0.01 maximum |
| Iron | Balance |

Commercial low alloy welding electrode wire of high strength generally contains at least 0.20 percent silicon in order to provide adequate deoxidation of the resulting weld deposit. As a result, the percentage of silicon left by the wire as well as by the flux is usually of sufficient magnitude to adversely effect the reduction in area and the impact resistance of the weld deposit. In contrast thereto, the electrode wire of the above composition is specifically designed to include no more than 0.04 percent silicon. The additional quantity required for the deoxidation of the molten wire is supplied by the silicon content of the neutral flux. Furthermore, since the melting rate of the flux is greater than that of the electrode wire, the major portion of the silicon therein is entrapped in the slag upon the solidification thereof thereby minimizing the silicon content of the weld deposit and consequently reducing the susceptibility thereof to embrittlement and resultant cracking.

Inasmuch as up to half of the carbon in the electrode wire is generally lost during the melting thereof, the initial carbon therein is set at a high percentage than that required in the weld deposit. However, care must be taken to keep the carbon low enough to avoid leaving more than 0.25 percent in the weld deposit composition. This is lower than the nominal 0.30 percent in the AMS 6427D steel being welded because of the self-quenching characteristic of the weld deposit which, for the same percentage of carbon, would produce a greater hardenability value and consequently a greater susceptibility to cracking. This is feasible since it has been found that the carbon can be added to the welding flux to replace the major portion which is unexpectedly lost during the melting of the electrode wire.

The electrode wire must also include sufficient manganese to assist in the deoxidation of the weld deposit. Therefore, the manganese content of the electrode wire has been established at the relatively low level of 0.45 – 0.50 percent in order to leave 0.33 – 0.35 percent in the weld deposit. Any greater percentage of manganese in the electrode wire would result in a corresponding increase thereof in the weld deposit thereby reducing the impact resistance thereof to an unacceptable extent at a yield strength level in excess of 160 ksi.

Another important distinction of the above electrode wire composition over that of existing commercial varieties is the unusually high nickel content thereof. It has been found that about 3.25 percent of nickel is necessary to provide the reduction in area and impact resistance required of the weld deposit. The molybdenum content is held to substantially the same percentage as the base metal being welded in order to maintain the hardenability of the weld deposit.

The remaining elements in the electrode wire are those which are also found in the AMS 6424D steel and at substantially the same percentages. The copper and aluminum should not exceed the maximum percentages listed in the above analysis and preferably the sum of both should be less than 0.10 percent. The impurities, such as phosphorus and sulfur, are kept to the lowest practical level below the listed maximum percentages.

The welding flux is formulated as a neutral silicate-base composition with a specified content of free carbon and silicon. It has been found that 0.30 percent of carbon in the flux will be sufficient to replenish the amount lost during the melting of the electrode and still provide the weld deposit with the 0.20 – 0.25 percent required to provide the desired yield strength. At the same time, the flux should also contain between 1.5 – 3.0 percent silicon in order to provide the deoxidation function required thereof and yet, when combined with the extremely low percentage in the electrode wire, will not leave more than 0.18 – 0.22 percent of silicon in the weld deposit. The remainder of the flux is comparable to commercial formulations as, for example, the 880 type supplied by Lincoln Electric Co. of Cleveland, Ohio which consist of silicon and various other oxides as well as complex silicates of such metals as aluminum, sodium, calcium and magnesium. However, unlike commercial compositions, the flux is here specifically formulated to contain as little manganese as possible up to a maximum of 0.05 percent. Thus, the manganese content of the weld deposit will be limited to the percentage in the electrode wire minus the portion consumed by the deoxidation function thereof thereby providing a high level of impact resistance.

When a welding electrode of the composition specified herein is utilized with the above-described neutral flux in the submerged arc welding process in accordance with sound welding practice, the resulting weld deposit will possess the following composition range:

| Element | Percent by Weight |
| --- | --- |
| Carbon | 0.20 – 0.25 |
| Manganese | 0.33 – 0.35 |
| Silicon | 0.18 – 0.22 |
| Nickel | 3.0 – 3.5 |
| Chromium | 0.80 – 0.87 |
| Molybdenum | 0.62 – 0.68 |
| Vanadium | 0.07 – 0.10 |
| Copper | 0.08 maximum |
| Aluminum | 0.04 maximum |
| Phosphorus | 0.008 maximum |
| Sulfur | 0.008 maximum |
| Iron | Balance |

Upon being subjected to a heat treatment consisting of the following steps: (a) normalizing at 1,750°F for 1¼ hours, (b) austenitizing at 1,600°F for 1¼ hours followed by an oil quench, and (c) a double tempering at 1,050°F for 2 hours with a water quench terminating each tempering cycle, the mechanical properties of the weld deposit will approach those of the base metal, namely; a room temperature yield strength of 162–165 ksi, a reduction in area of 55.1 – 60.1 percent and a Charpy V-notch impact strength of 20.0 –25.0 ft/lbs. at −40°F. This unusual combination of strength, reduction in area, and impact resistance in a weld deposit is not known to have been heretofore attained with commercial combinations of electrode wire and welding flux even though the steels from which the electrodes were fabricated were capable of being heat treated to yield the desired combination of mechanical properties.

For example, a 1¼ inch plate of the AMS 6427D steel was welded by a metal shielded stick process utilizing three different commercial flux-coated electrode wires which were furnished by the respective manufactures as capable of yielding the desired combination of mechanical properties. TABLE I lists the nominal chemical compositions of these wires as well as that of the AMS 6427D gun steel wire while TABLE II contains the compositions of the weld deposits produced with these electrode wires. Although the specific compositions of the flux coatings were unknown due to the proprietary nature thereof, a cursory investigation did indicate that the manganese and silicon content thereof was considerably higher than the flux designed for use with the electrode wire of the AMS 6427D alloy steel.

TABLE I

| Element (Percent by Weight) | Electrode | | | |
| --- | --- | --- | --- | --- |
| | P&H 4130 | P&H 4340 | *HY-140 HT | AMS 6427D |
| Carbon | .30 | .40 | .10 | .38 |
| Manganese | .48 | .68 | .75 | .48 |
| Silicon | .20 | .28 | .30 | .04 |
| Nickel | .12 | 1.87 | 5.00 | 3.25 |
| Chromium | .91 | .74 | .55 | .87 |
| Molybdenum | .20 | .25 | .55 | .64 |
| Vanadium | None | None | .06 | .09 |
| Copper | Unknown | Unknown | Unknown | .08 |
| Aluminum | Unknown | Unknown | Unknown | .04 |
| Phosphorus | .015 | .02 | .01 | .006 |
| Sulfur | .015 | .013 | .01 | .01 |
| Iron | Balance | Balance | Balance | Balance |

*HY-140 HT — heat treatable type

These electrode wires were utilized with the proprietary fluxes furnished by the respective manufacturers and were found to produce weld deposits with the compositions shown in the following table:

TABLE II

| Element (Percent by Weight) | Weld Deposit | | | |
| --- | --- | --- | --- | --- |
| | P&H 4130 | P&H 4340 | HY-140 HT | AMS 6427D |
| Carbon | .18 | .38 | .085 | .22 |
| Manganese | 1.40 | .94 | .60 | .34 |
| Silicon | .40 | .70 | .45 | .20 |
| Nickel | 1.25 | 1.90 | 8.20 | 3.25 |
| Chromium | .45 | .80 | .40 | .83 |
| Molybdenum | .30 | .40 | .50 | .65 |
| Vanadium | None | None | .08 | .085 |
| Copper | .12 | .04 | .18 | .08 |
| Aluminum | .03 | .03 | .06 | .04 |
| Phosphorus | Unknown | Unknown | .006 | .008 |
| Sulfur | Unknown | Unknown | .004 | .008 |
| Iron | Balance | Balance | Balance | Balance |

It should be understood that while the above analyses are dependent upon the proper selection of such operating parameters as arc voltage, travel speed, etc., the best commercial welding practice was followed in each case in order to insure a meaningful comparison of the weld deposit compositions. TABLE IV shows the actual mechanical properties which were obtained when the weld deposit area of the plates was heat treated in accordance with the procedures of TABLE III and compares such results with the particular mechanical properties anticipated by each of the respective manufacturers as a result of their experience in the submerged arc welding of alloy steels having comparable yield strength values.

TABLE III

|  | Normalize | Austenitize | Double Temper |
|---|---|---|---|
| P&H 4130 | 1750°F - 1.25 hrs. | 1600°F - 1.25 hrs. oil quench | 1050°F - 2 hrs. water quench |
| P&H 4340 | 1750°F - 1.25 hrs. | 1600°F - 1.25 hrs. oil quench | 1050°F - 2 hrs. water quench |
| HY-140 HT | None | 1600°F - 1.25 hrs. oil quench | 1100°F - 1 hr. water quench |
| AMS-6427D | 1750°F - 1.25 hrs. | 1600°F - 1.25 hrs. oil quench | 1050°F - 2 hrs. water quench |

TABLE IV

|  | P&H 4130 | P&H 4340 | HY-140 HT | AMS-6427D |
|---|---|---|---|---|
| YIELD STRENGTH (KSI) | | | | |
| ACTUAL | 139-140 | 167-168 | 147-159 | 162-165 |
| ANTICIPATED | 150 | 252 | 149 | |
| REDUCTION IN AREA (Percent) | | | | |
| ACTUAL | 31.2 - 41.5% | 7.6 - 9.3% | 3.2 - 5.4% | 55.1 - 60.1% |
| ANTICIPATED | 57% | 29% | 61% | |
| CHARPY V-NOTCH (Ft/Lbs. at −40°F) | | | | |
| ACTUAL | 10.0 - 16.4 | 3.8 - 6.3 | 10.2 - 21.5 | 20.0 - 25.0 |
| ANTICIPATED | 28 | 13 | 47 | |

As shown in TABLE IV, while each of the three commercial welds did provide adequate high strength levels, the reduction in area values and the Charpy V-notch impact readings not only fell far short of those attained with the wire and flux combination of this invention but also were considerably lower than the values claimed by the individual manufacturers of the listed electrode wires. It is believed that the large differences between these actual and anticipated values were chiefly due to the relatively large percentage of silicon in the weld deposit. The P&H 4130 and the HY-140 HT included twice as much silicon as the AMS-6427D weld deposit while the silicon in the P&H 4340 deposit was about 3.5 times as great. Another factor which may have been responsible for the relatively low reduction in area and impact values obtained from the weld deposits produced with commercial electrode wire and flux combinations is believed to be the percentage of manganese therein. As shown in TABLE II, the manganese content of the three commercial weld deposits was from 2 to 4 times as great as that contained in the AMS-6427D weld deposit and consequently is believed to have contributed to the considerably lower reduction in area and impact resistance values.

Accordingly, the present invention provides a unique combination of welding wire and flux for use in the submerged arc welding process and, unlike existing commercial compositions, such combination will provide a weld deposit capable of being heat treated to the high reduction in area and impact resistance values obtained with such high strength steels as SAE 4130, SAE 4340, and ams-6427D. This desirable result is readily attainable without the need for any preheating or postheating of the weld deposit.

The foregoing disclosure and description of the invention is illustrative only. Various changes may be made within the scope of the appended claims without departing from the spirit of the invention.

I claim:

1. A submerged arc method of welding a medium carbon, nickel-chromium-molybdenum-vanadium alloy steel comprising the steps of, providing an electrode wire having the following composition:

|  | Percent by Weight |
|---|---|
| Carbon | 0.35 - 0.40 |
| Manganese | 0.45 - 0.50 |
| Silicon | 0.04 maximum |
| Nickel | 3.25 - 3.50 |
| Chromium | 0.85 - 0.90 |
| Molybdenum | 0.62 - 0.66 |
| Vanadium | 0.08 - 0.10 |
| Copper | 0.08 maximum |
| Aluminum | 0.04 maximum |
| Phosphorus | 0.008 maximum |
| Sulfur | 0.01 maximum |
| Iron | Balance | providing a neutral silicate-base flux having a maximum of 0.05 percent by weight of manganese, 1.5 − 3.0 percent by weight of silicon, and about 0.30 percent by weight of added carbon, forming an electric arc between the electrode wire and the alloy steel to continuously melt the end portion of the wire, feeding the wire toward the weld area while simultaneously traversing the arc therealong, and depositing, at the same time, a sufficient quantity of flux to completely cover the arc and protect the molten metal in the weld area during the solidification thereof into a weld deposit having the following composition:

|  | Percent by weight |
|---|---|
| Carbon | 0.20 - 0.25% |
| Manganese | 0.33 - 0.35 |
| Silicon | 0.18 - 0.22 |
| Nickel | 3.0 - 3.5 |

| | Percent by weight |
|---|---|
| Chromium | 0.80 – 0.87 |
| Molybdenum | 0.62 – 0.68 |
| Vanadium | 0.07 – 0.10 |
| Copper | 0.08 maximum |
| Aluminum | 0.04 maximum |
| Phosphorus | 0.008 maximum |
| Sulfur | 0.008 maximum |
| Iron | Balance | the weld deposit being heat-treatable to a room temperature yield strength of 160–180 ksi, a ductility as measured by a reduction in area between 55.1 – 60.1 percent, and a Charpy V-notch impact strength of 20–25 ft/lbs at −40°F.

2. In a submerged arc method of welding a medium carbon, nickel-chromium-molybdenum-vanadium steel to produce a weld deposit having the following composition by weight: 0.22 percent carbon, 0.34 percent manganese, 0.20 percent silicon, 3.25 percent nickel, 0.83 percent chromium, 0.65 percent molybdenum, 0.08 percent vanadium, 0.08 percent maximum copper, 0.04 percent aluminum, 0.008 percent maximum phosphorus, 0.008 percent sulfur, and the balance of iron, the weld deposit being heat-treatable to a room temperature yield strength of 162 ksi, a ductility as measured by a reduction in area of 56 percent, and a Charpy V-notch impact resistance of 25 ft/lbs at −40°F, the improvement of tailoring the compositions of the electrode wire and the neutral silicate-base flux utilized therewith to provide the desired percentages of silicon and the manganese in the weld deposit, comprising the steps of, limiting the wire to a silicon content of about 0.03 percent by weight and a manganese content of about 0.48 percent by weight, and limiting the flux to a silicon content of about 2.25 percent by weight and a manganese content of about 0.04 percent by weight.

* * * * *